United States Patent [19]
Weis

[11] Patent Number: 4,733,972
[45] Date of Patent: Mar. 29, 1988

[54] FLOATING MIXER APPARATUS WITH FOAM DISPERSING SPRAY

[75] Inventor: Ronald J. Weis, So. Beloit, Ill.

[73] Assignee: Aqua-Aerobic Systems, Inc., Rockford, Ill.

[21] Appl. No.: 71,317

[22] Filed: Jul. 9, 1987

[51] Int. Cl.[4] ............................................. B01F 7/22
[52] U.S. Cl. .................................. 366/270; 366/136; 366/167; 366/251; 366/343
[58] Field of Search ............... 366/251, 270, 136, 167, 366/343, 263, 264, 249, 245, 247, 279; 261/91, 93, 120; 239/11, 13, 16, 23; 417/61

[56] References Cited
U.S. PATENT DOCUMENTS

| | | |
|---|---|---|
| Re. 27,853 | 5/1970 | Frohwerk . |
| 3,606,273 | 9/1971 | Johnson . |
| 3,756,578 | 9/1973 | McGurk . |
| 3,785,558 | 1/1974 | Albritton et al. . |
| 4,422,771 | 12/1983 | Earhart et al. . |

Primary Examiner—Timothy F. Simone
Attorney, Agent, or Firm—Vernon J. Pillote

[57] ABSTRACT

A floating mixer of the type including a float for buoyantly supporting the mixer in a water treatment basin, a mixer drive motor mounted on the float and extending upwardly therefrom, and a propeller drivingly connected to the motor and disposed below the float for pumping liquid downwardly to effect mixing in the water treatment basin. A foam dispersing spray nozzle is mounted above the drive motor for discharging in a downwardly directed generally conical spray pattern outwardly of the drive motor, and an auxiliary pump is provided for pumping liquid from the basin to the spray nozzle.

3 Claims, 2 Drawing Figures

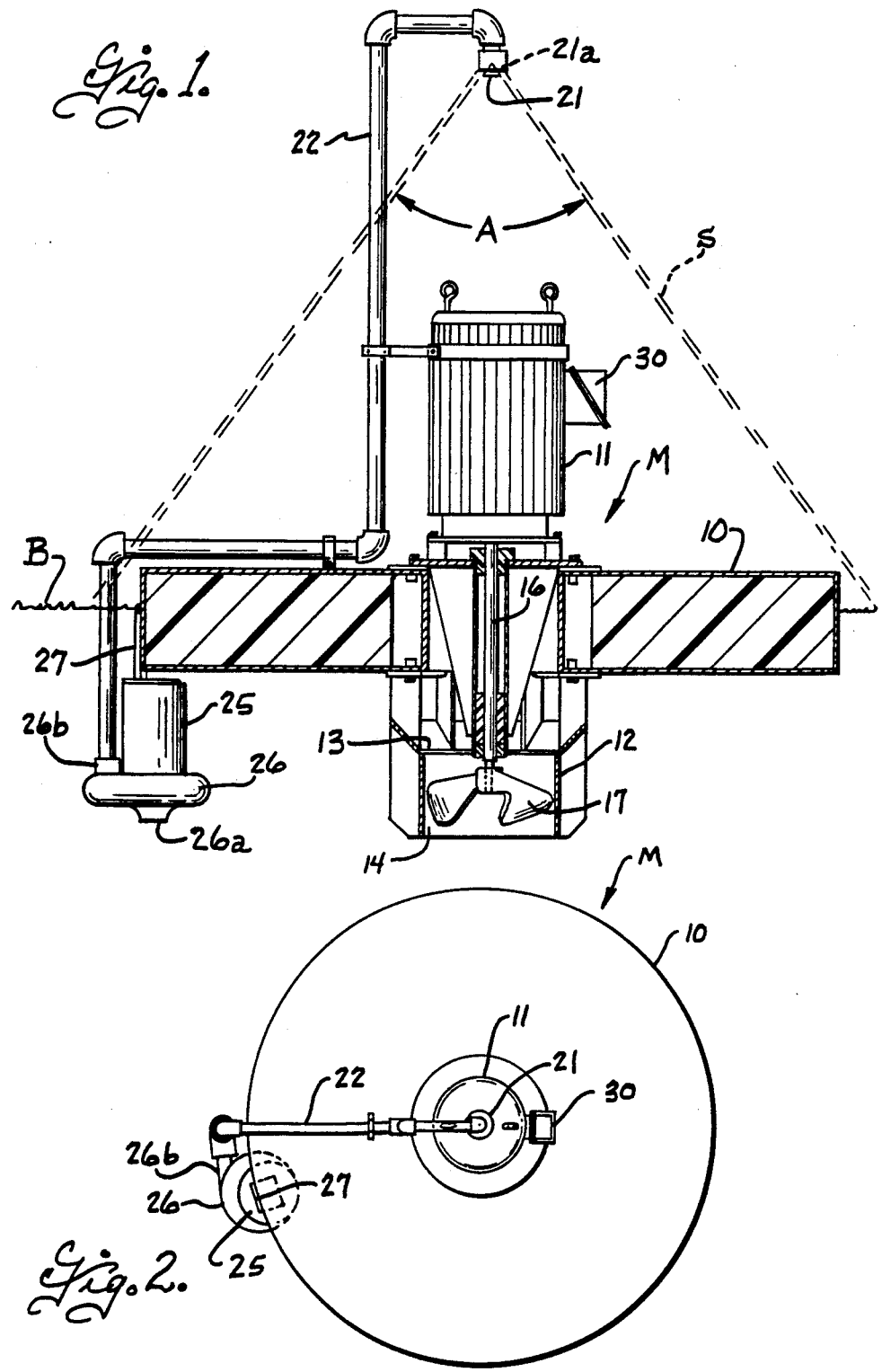

FLOATING MIXER APPARATUS WITH FOAM DISPERSING SPRAY

BACKGROUND OF THE INVENTION

Aerated lagoons, ponds or tanks, hereinafter referred to generally as water treatment basins, are commonly used as a part of an overall water treatment system. Such water treatment basins generally utilize diffusion type aerators or mechanical aerators. In diffusion type aerators, air or oxygen is introduced into the water under pressure through submerged diffusers or nozzles. Mechanical type aerators generally agitate the water so as to promote solution of air from the atmosphere into the water.

Mixers are sometimes employed in the water treatment basins to maintain solids in suspension and to improve distribution of oxygen in the basin. However, the water in some water treatment basins, due to industrial chemicals and/or fertilizers from runoff, tends to foam. Since mixers are generally arranged to draw water from adjacent the surface of the basin and pump it downwardly toward the bottom of the water treatment basin in order to maintain the solids in suspension and improve distribution of the aerated water in the basin, the mixers tend to draw the foam on the surface of the basin toward the mixers. Foam levels have been encountered in some water treatment basins that are so high that they cover the mixer and mixer motor and problems have been encountered in overheating and burn out of the mixer motors.

SUMMARY OF THE INVENTION

It is an object of the present invention to provide a floating mixer apparatus that overcomes the problems of the prior art by providing a foam dispersing spray arranged to disperse and break up the foam around the mixer motor and prevent overheating of the motor.

Accordingly, the present invention provides a floating mixer apparatus including a float for buoyantly supporting the mixer apparatus in a water treatment basin, a mixer drive motor mounted on the float and extending upwardly therefrom, pump casing means mounted on the float and having an upper intake opening below the float and a lower discharge outlet, and propeller means in the pump casing means for pumping liquid from the upper intake opening downwardly through the lower discharge outlet. A foam dispersing spray means is provided on the mixer and includes a spray nozzle mounted above the drive motor for discharging liquid in a downwardly directed generally conical spray pattern outwardly of the drive motor, and an auxiliary pump means for pumping liquid from the basin to the spray nozzle.

The auxiliary pump means advantageously comprises a submersible motor-pump unit mounted on the float at a location below the liquid level in the basin, and pipe means connecting the discharge of the auxiliary pump means to the spray nozzle. A switch responsive to the temperature of the mixer drive motor is advantageously provided for shutting the mixer drive motor off when the temperature of the mixer drive motor exceeds a preset safe operating temperature in the event of pump failure or clogging of the pump, spray nozzle or the interconnecting piping.

BRIEF DESCRIPTION OF THE DRAWINGS

FIG. 1 is a sectional view through a floating mixer having a foam dispersing spray means; and
FIG. 2 is a plan view of the floating mixer of FIG. 1.

DETAILED DESCRIPTION

The present invention relates to improvements in floating mixer apparatus and particularly to an improvement wherein the floating mixer apparatus has a foam dispersing spray means for discharging a downwardly directed generally conical spray pattern outwardly of the mixer drive motor to disperse and break up foam around the mixer drive motor. In general, the floating mixer M includes a float means 10 for buoyantly supporting the mixer apparatus at the surface B of a water treatment lagoon, pond or tank, hereinafter generally referred to as a water treatment basin. Mixer drive motor means 11 is mounted on the float means and extends upwardly therefrom. A pump casing means 12 is mounted on the float means and has an upper intake opening 13 and a lower discharge outlet 14. A propeller shaft means 16 is drivingly connected to the mixer drive motor 11 and extends downwardly therefrom, and a propeller means 17 is mounted on the lower end of the propeller shaft means and in the pump casing means 12. The mixer drive motor 11 is arranged to drive the propeller 17 in a direction to pump liquid from the upper intake opening 13 downwardly through the discharge outlet 14. The mixer thus draws liquid from adjacent the surface of the water treatment basin and pumps it downwardly and, if there is foam on the surface of the water treatment basin, the inflow of water to the mixer adjacent the surface of the water treatment basin will tend to cause the foam on the surface of the basin to move toward the mixer. The water in some water treatment basins, due to industrial chemicals and/or runoff of fertilizers from surrounding areas, produce very thick and dense foams which can cover the mixer motor and shut off the flow of cooling air as well as introduce contaminants into the motor and bearings through the vents in the motor.

In accordance with the present invention, a foam dispersing means is provided for dispersing and breaking up the foam around the mixer drive motor. For this purpose, a spray nozzle 21 is supported as by piping 22 at a location spaced above the mixer drive motor 11 and preferably generally coaxially thereof. The nozzle 21 is of the type having a downwardly directed generally conical orifice 21a arranged to discharge an annular sheet of liquid in a downwardly directed generally conical spray pattern S outwardly of the mixer drive motor 11. The height of the nozzle and the internal angle A of the spray pattern are selected such that the conical spray is normally spaced outwardly from the mixer drive motor. The spray pattern is preferably arranged to extend adjacent the outer periphery of the float 10, as shown in FIG. 1. An auxiliary pump means, preferably in the form of a submersible motor-pump unit having a motor 25 and pump 26, is provided for supplying water to the spray nozzle 21. The motor pump unit is preferably mounted as by a bracket 27 on the float so as to be disposed below the liquid level of the water in the basin. The pump 26 has an inlet 26a submerged in the water treatment basin and an outlet 26b connected to the pipes 22 to deliver fluid from the auxiliary pump to the spray nozzle.

Power is supplied to the motor 25 of the auxiliary motor-pump unit under the control of a manually operable switch and power supply cable (not shown) and is preferably arranged so as to maintain the auxiliary motor-pump unit in continuous operation when foam is present in the water treatment basin. Power to the mixer drive motor 11 is preferably supplied under the control of a temperature responsive switch means 30 that is responsive to the temperature of the mixer drive motor and which is operative, when the temperature of the drive motor exceeds a preselected safe operating temperature, to interrupt the supply of power to the mixer drive motor.

The construction and operation of the mixer with foam dispersing spray is deemed apparent from the foregoing description. In general, the foam dispersing spray discharges a downwardly directed conical spray around and outwardly of the mixer drive motor so as to disperse and break up foam that may drift onto the mixer due to either the inflowing circulation pattern of the water toward the mixer or wind patterns or both. This inhibits build up of foam around the mixer drive motor and allows continued air circulation through the motor to cool the same. Moreover, dispersing of the foam around the mixer drive motor inhibits the entrance of contaminants from the foam into the motor and motor bearings. If high wind conditions cause the foam to temporarily drift over the mixer at a rate greater than the spray can disperse, the wind will also tend to cause the spray to shift toward and contact the motor to aid in cooling of the motor under these conditions. The downwardly directed spray tends to induce an air circulation around the motor to aid in maintaining a flow of cooling air to the motor and also aids in aerating the water in the basin.

The embodiments of the invention in which an exclusive property or privilege is claimed are defined as follows:

1. A floating mixer apparatus including float means for buoyantly supporting the mixer apparatus in a water treatment basin, mixer drive motor means mounted on the float means and extending upwardly therefrom, pump casing means mounted on the float means and having an upper intake opening below the float means and a lower discharge outlet, and propeller means in the pump casing means for pumping liquid from the upper intake opening downwardly through the lower discharge outlet, foam dispersing spray means including spray nozzle means mounted above the mixer drive motor means for discharging liquid in a downwardly directed generally conical spray pattern outwardly of the mixer drive motor means, and auxiliary pump means for pumping liquid from the basin to the spray nozzle means.

2. A floating mixer according to claim 1 wherein said auxiliary pump means comprises a submersible motor-pump unit having an intake and a discharge means, means mounting the auxiliary motor-pump means on the float means at a location to be below the liquid level in the basin, and pipe means connecting the discharge means of the auxiliary pump means to the spray nozzle means.

3. A floating mixer according to claim 1 including switch means responsive to the temperature of the mixer drive motor means for shutting the mixer drive motor off when the temperature of the mixer drive motor exceeds a preset safe operating temperature.

* * * * *